S. L. HANSON.
HAY CARRIER.
APPLICATION FILED NOV. 2, 1908.
947,384.
Patented Jan. 25, 1910.
2 SHEETS—SHEET 2.
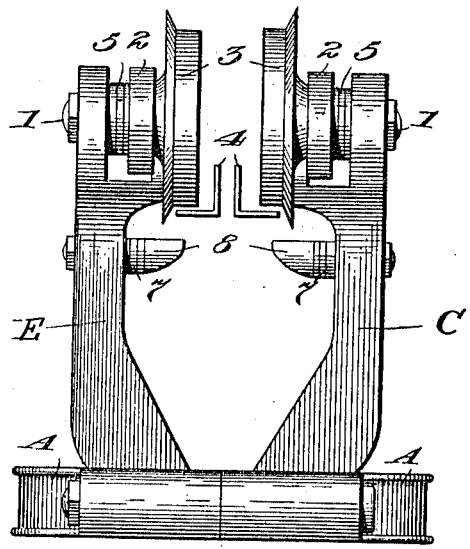
Fig. 3.
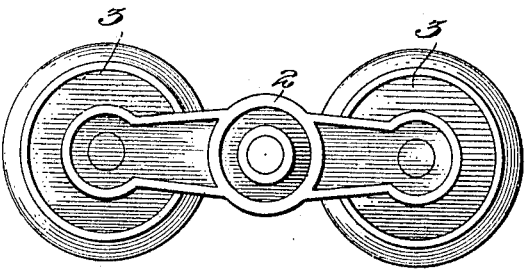
Fig. 4.
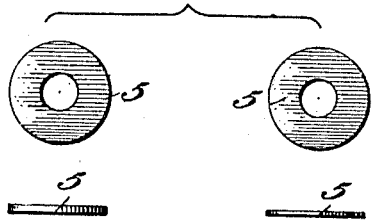
Fig. 5.
Fig. 7.
Witnesses:
Palma Thompson.
Gilbert Knudson.
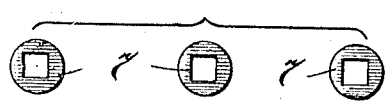
Fig. 6.
Inventor:
Samuel L. Hanson

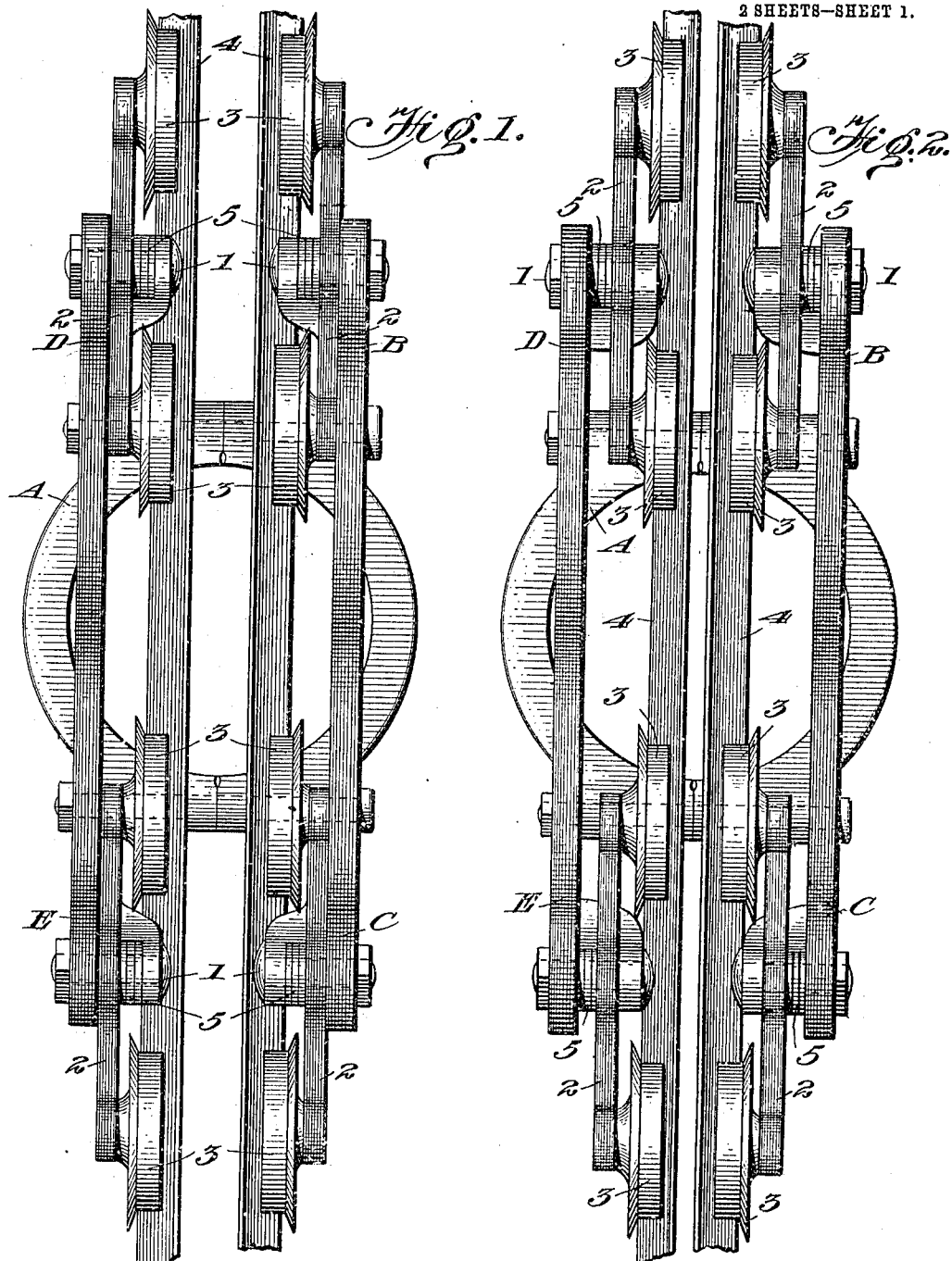

UNITED STATES PATENT OFFICE.

SAMUEL L. HANSON, OF ALBERT LEA, MINNESOTA.

HAY-CARRIER.

947,384.  Specification of Letters Patent.  Patented Jan. 25, 1910.

Application filed November 2, 1908. Serial No. 460,800.

*To all whom it may concern:*

Be it known that I, SAMUEL L. HANSON, a citizen of the United States, residing at the city of Albert Lea, in the county of Freeborn and State of Minnesota, have invented certain new and useful Improvements in Hay-Carriers, of which the following is a specification.

My invention relates to improvements in hay carriers of the class intended more particularly for use on metal tracks, and the object of my invention is to provide simple, inexpensive and easily applied means to adjust said carriers to tracks of different widths. I attain this object by the mechanism illustrated in the accompanying drawings, in which—

Figures 1 and 2 are top views of an ordinary carrier, suspended from a metal track 4 4; Fig. 3 is an end view of said carrier so suspended on a metal track; Fig. 4 is a side view of the wheel arms and track wheels upon which the carrier is suspended; Fig. 5 is a view of the adjusting washers used in connection with the wheel arms in the accompanying drawings; Fig. 6 is a view of the guide pin, and Fig. 7 is a view of the adjusting washers used in connection with the guide pin in the accompanying drawings.

Similar letters and numbers refer to similar parts throughout the several views.

In the accompanying drawings, A A, B C and D E of Figs. 1 and 2 constitute the main frame of an ordinary hay carrier; and in Fig. 3 A A and C E show the main frame of said carrier. A A is the circular base of the main frame of said hay carrier and B C and D E are upwardly projecting arms or hangers of said main frame. The upper extremities or projections of said hangers may be made bifurcated as in the drawings, or single. To the upper extremities of said hangers B C and D E may be fastened by a pin or bolt 1 a single track wheel or, as in the drawings, the wheel arms 2; to the ends of the wheel arms are secured by bolts track wheels 3 with flanges on the outer side so that the same will run on track 4 4.

Fig. 5 shows the adjusting washer by means of which the carrier can be adjusted to tracks of different widths, one or more of said washers may be used on each bolt or pin as necessity requires. For a narrower track washers 5 5 and 5 5 are placed on the outside of the track wheel, or wheel arms as shown in Figs. 1 and 3. For a wider track washers 5 5 and 5 5 are placed on the inside of the track wheel or wheel arms as shown in Fig. 2.

Fig. 3 shows the guide pins 8 so placed as to prevent the carrier from leaving the track. One guide pin is also shown in detail in Fig. 6.

Fig. 7 shows the washers used in connection with the guide pins; 7 in Fig. 3 shows the adjusting washers used in connection with the guide pins, placed on the inside of the hangers of the main frame when the carrier is adjusted for a narrow track. The washers are placed outside of the hangers when the carrier is adjusted for a wider track.

Having now described my invention what I claim as new and desire to secure by Letters Patent is—

A hay carrier comprising a frame having spaced hangers fixedly connected together and adapted to rest at opposite sides of track rails, traveling wheels adapted to bear on said rails, transverse bolts removably arranged in the hangers and connected with the wheels, nuts on said bolts, washers surrounding the bolts and interposed between the hangers and opposed abutments on the bolts, spaced transverse guide pins removably arranged in the hangers and extending inward therefrom and adapted to rest under the rails and having enlargements on their inner portions, nuts mounted on the outer portions of said pins, and washers arranged on the pins and interposed between the said enlargements thereof and the hangers.

In testimony whereof I affix my signature in presence of two witnesses.

SAMUEL L. HANSON.

Witnesses:
 GERTIE SWENSON,
 I. L. INGBRITSON.